United States Patent Office 3,565,838
Patented Feb. 23, 1971

3,565,838
NONADHESIVE SURFACE TREATING
COMPOSITIONS
Hugh Cuthbert Atkinson, Greenock, and Robert Muir Gibbon, West Kilbride, Scotland, assignors to Imperial Chemical Industries Limited, London, England, a corporation of Great Britain
No Drawing. Filed Nov. 20, 1968, Ser. No. 777,467
Claims priority, application Great Britain Nov. 24, 1967, 53,634/67
Int. Cl. C08g 47/02; D21h 1/28
U.S. Cl. 260—18
7 Claims

ABSTRACT OF THE DISCLOSURE

A composition suitable for coating papers, films and foils to impart good release characteristics is disclosed. The composition contains an organohydrogenpolysiloxane, a linear diorganopolysiloxane having terminal hydroxy groups or groups readily hydrolysable to hydroxy groups, a polysiloxane resin, an amino compound such as tetraethylene-pentamine and a tin curing agent such as an organotin acylate. The composition are useful for coating paper and other substrates when used as a protective backing for articles coated with adhesives.

This invention relates to new and useful treating compositions, and, more particularly, to such treating compositions as are suitable for use on films to give release properties and which are based on organopolysiloxanes.

A wide variety of compositions based on organopolysiloxanes have been used for treating films of paper, metal foils and synthetic films of, for example, polyolefins, polyesters, polyvinyl chloride or polyamides, to give a surface having good release properties and which can be used as a protective backing for articles coated with adhesives. Among the proposed compositions have been mixtures of organopolysiloxane resins and organopolysiloxanes capable of being cured to an elastomer. Many of such compositions give very good release properties and because of this are unsuitable for certain types of articles coated with certain types of adhesive since in many cases the article is too easily released and in other cases the release properties of a coated paper or other film deteriorates with aging.

According to the present invention a new and useful composition suitable for coating paper or other films or foils comprises an organohydrogenpolysiloxane, a linear diorganopolysiloxane having terminal hydroxy groups or groups readily hydrolysable to hydroxy groups, a polysiloxane resin, an amino compound and a tin compound, said organohydrogenpolysiloxane being present in amount from 3 to 20 parts by weight per 100 parts by weight of the said diorganopolysiloxane, and there being from 1 to 99 parts by weight of said diorganopolysiloxane per 100 parts by weight of diorganopolysiloxane plus polysiloxane resin, the amino compound and tin compound both being present in amounts from 1 to 20 parts by weight per 100 parts by weight of total polysiloxanes.

The organohydrogenpolysiloxane may be linear or cyclic and may vary widely in molecular weight, for example, it may be of viscosity from 2 to 1,000 cp. at 25° C. It is, however, in general preferred that it should be of viscosity from 5 to 50 cp. at 25° C. and it is also preferred that it be linear. The terminal groups on the organohydrogenpolysiloxane, when present, may be triorganosilyl groups, diorganohydrogensilyl or diorganohydroxysilyl groups. The organo groups in the organohydrogenpolysiloxane, not all of which need be alike, may be alkyl, aryl, aralkyl, alkaryl, alkenyl, cycloalkyl, or cycloalkenyl groups or such groups containing substituents. It is, however, in general preferred that the organo groups be alkyl groups. Suitable groups which may be present include, for example, methyl, ethyl, vinyl, allyl, phenyl, trifluoropropyl, chlorophenyl, cyanoethyl and cyanopropyl groups. It is, however, preferred that at least the major proportion of the organo groups be methyl groups. It is further preferred that the organohydrogenpolysiloxane be comprised essentially of methylhydrogenpolysiloxanyl units and that it be trimethylsilyl ended.

The diorganopolysiloxane may be of widely varying molecular weight, for example, it may be of viscosity from 100 to 200,000 cp. at 25° C. It is, however, preferred that it should be of viscosity from 300 to 100,000 cp. at 25° C. When the terminal groups are not hydroxyl groups but groups readily hydrolysable to hydroxyl groups, they may be, for example, alkoxy, aryloxy or acyloxy groups such as methoxy, ethoxy, butoxy, phenoxy and acetoxy groups. It is sufficient to have one of such groups at each end of the polysiloxane chain and it is in fact normally preferred not to have more than one of such groups at each end. The remaining organo groups in the diorganopolysiloxane may be, for example, alkyl, aryl, alkenyl, alkaryl, aralkyl, cycloalkyl or cycloalkenyl groups, or such groups containing substituents such as, for example cyano groups, chlorine or fluorine. Suitable organo groups include, for example, methyl, ethyl, vinyl, allyl, phenyl, trifluoropropyl, chlorophenyl, cyanoethyl and cyanopropyl groups. It is, however, in general preferred that at least the major proportion of the organo groups be methyl. It is also in general preferred that the diorganopolysiloxane should be present in amount from 25 to 75 parts by weight per 100 parts by weight of the diorganopolysiloxane plus polysiloxane resin.

The organopolysiloxane resins which may be used are preferably those having the average general formula

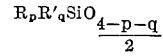

where

R is a hydrocarbyl group such as alkyl, aryl, alkaryl, aralkyl or alkenyl group, for example, a methyl, ethyl, vinyl, allyl, phenyl, benzyl or hexyl group.
R' is an alkoxy group having not more than six carbon atoms or a hydroxyl group.
$p$ is not less than 0.9.
$q$ is from 0 to 0.8.
$p+q$ is from 0.9 to 1.7.

For some purposes phenyl groups with or without methyl groups, are preferred for the group R but in general the most preferred group is a methyl group. Suitable groups R' include, for example, hydroxy, methoxy, ethoxy, propanoxy and butoxy groups. It is, however, in general preferred that R' should be hydroxy, methoxy or butoxy groups. The resins used may be those capable of being cured by heating at elevated temperature but it is in general preferred to use an air drying resin, that is, one which cures to a tack-free state at low temperatures, for example, 20 to 100° C.

A wide variety of amino compounds may be used in the compositions of our invention and these should have a basic dissociation constant greater than $10^{-9}$ at 20° C. and preferably greater than $10^{-5}$ at 20° C. Amino compounds which may be used include primary, secondary and tertiary aliphatic amines, aminoalkoxysilanes and aminoalkoxypolysiloxanes, such as for example, butylamine, diethylamine, triethylamine, diethanolamine, octylamine, octadecylamine, piperadine, morpholine, triethylenediamine, triethylenetetramine, tetraethylenepentamine, tetramethyltriethylenetetramine, pentamethyletriethylenetetramine, heptamethyltetraethylenepentamine, methyltri(aminoethoxy)silane, tetra(aminoethoxy)silane and methyltri(-N,N-diethylaminoethoxy)silane. Preferred amino compounds are tetraethylenepentamine, heptamethyltetraethylenepentamine and methylaminoethoxypolysiloxanes, especially methyl(N,N-dimethylaminoethoxy)polysiloxanes.

The tin compound used as catalyst may be a tin acylate, an organotin acylate, an organotin alkoxide or an organotin oxime, for example, such as stannous octoate, dibutyltin diacetate, dibutyltin dilaurate, dioctyltin dioctoate, dibutyltin dibutoxide, tetrabutyldistannoxane diacetate, tetraoctyldistannoxane diacetate, dibutyltin dibenzaldoxime or tetrabutyldistannoxane dibenzaldoxime. Dibutyltin diacetate and dibutyltin dilaurate are, however, in general preferred.

The compositions of our invention will normally be dissolved in a solvent, although a solvent is not always necessary. If used the solvent may be, for example, an aromatic or aliphatic hydrocarbon, an ether, ester, ketone or alcohol. Suitable solvents which may be used include, for example, toluene, xylene, petroleum fractions, methyl-ethyl ketone, acetone, isopropanol and ethyl acetate. Widely varying proportions of solvent may be used, for example, the solutions may contain from 1 to 50 parts by weight of solid per 100 parts of total weight of solution. It is, however, in general preferred that it should have from 3 to 10 parts by weight per 100 parts of total weight of solution. Preferred solvents are toluene and xylene.

The compositions of our invention may also, if desired, contain other additives, for example, such as thickeners. Suitable thickeners include, for example, ethyl cellulose.

The compositions of our invention have the advantages that they are suitable for coating paper or other films or foils to be used as a protective backing for articles coated with adhesives, that they will not give premature undesired release thereof and that the release properties of the coated film will not deteriorate or change substantially with aging.

Our invention is further illustrated by the following examples in which all parts and percentages are by weight.

The test procedures used in the examples were as follows:

(1) Initial release (IR).—1 inch wide laminates of adhesive tape and film coated with composition were maintained under a pressure of 4 oz. per square inch at 22° C. for 20 hours. They were then separated at a stripping rate of 12 inches per minute and the load in grams necessary for this determined.

(2) Accelerated age (AA).—1 inch wide laminates of adhesive tape and film coated with composition were maintained under a pressure of 1 lb. per sq. in. at 60° C. for 20 hours. The laminates were separated at a stripping rate of 12 inches per minute and the load in grams necessary for this determined.

(3) Subsequent adhesion (SA).—An adhesive tape recovered from an accelerated age test was pressed to the underside of a horizontal glass plate. A load of 100 grams was applied to the adhesive tape and the time taken to peel the adhesive tape off over a length of 3 inches measured.

EXAMPLE 1

Five solutions, A–E, were prepared having the composition given in Table 1.

TABLE 1

| | Parts | | | | |
|---|---|---|---|---|---|
| | A | B | C | D | E |
| Hydroxy-ended dimethylpolysiloxane (500 cp. at 25° C.) | 0.7 | 1.7 | 3.5 | 5.3 | |
| Methylpolysiloxane resin (Me/Si=1.1/1 30 cp. at 25° C., 33% solids) | 7.0 | 6.3 | 5.3 | 3.5 | 1.7 |
| Linear methylhydrogenpolysiloxane (11 cp. at 25° C.) | 0.45 | 0.45 | 0.45 | 0.45 | 0.45 |
| Ethyl cellulose | 1.5 | 1.5 | 1.5 | 1.5 | 1.5 |
| Isopropanol | 3.0 | 3.0 | 3.0 | 3.0 | 3.0 |
| Toluene | 88 | 88 | 88 | 88 | 88 |

The five solutions A–E contained methylpolysiloxane resin and hydroxy-ended dimethylpolysiloxane in the proportions 100:0, 90:10, 76:24, 50:50 and 24:76 respectively. Each solution was divided into two equal portions and to both portions were added 0.5 part of dibutyltin diacetate per hundred parts of solution, whilst to one portion of each solution were also added .5 part of an aminoethoxymethylpolysiloxane, prepared as described hereinafter, per hundred parts of solution to give four compositions according to our invention and six not according to our invention.

Vegetable parchment paper was coated with the ten solutions so obtained using a No. 10 Meyer coating bar in the normal manner. The solvent was evaporated off and the composition cured by heating in an oven at 120° C. for 30 seconds.

The papers coated with the solution containing the aminoethoxymethylpolysiloxane compositions and according to our invention showed a noticeably better resistance to abrasion than the remainder.

After standing at 20° C. for 1 day the coated papers were made into laminates with adhesive tapes (S) Sellotape, as sold by Sellotape Products Ltd., London and (T) Takstrip, as sold by Samuel Jones & Co. Ltd., London, and release characteristics of the coatings determined in the manner described. The results obtained are given in Table 2.

TABLE 2

| | Ratio resin: OH ended siloxane | Test tape | No amino compound (not according to the invention) | | | Plus amino compound (according to the invention) | | |
|---|---|---|---|---|---|---|---|---|
| | | | Release, g./in. | | SA, secs. | Release g./in. | | SA, secs. |
| | | | IR | AA | | IR | AA | |
| Solution: | | | | | | | | |
| A | 100:00 | S | 500 | 600 | | *600 | *600 | |
| | | T | 500 | >700 | | *700 | *>700 | |
| B | 90:10 | S | 5 | 150 | | 60–80 | 220 | |
| | | T | 25 | 100 | 455 | 70–80 | 160 | 470 |
| C | 76:24 | S | 3 | 60 | | 90 | 220 | |
| | | T | 26 | 65 | | 70 | 220 | |
| D | 50:50 | S | 3 | 30 | | 40–60 | 170 | |
| | | T | 12 | 45 | 198 | 50–60 | 150 | 430 |
| E | 24:76 | S | 1 | 10 | | 40–60 | 80 | |
| | | T | 10 | 30 | 180 | 20 | 80 | 360 |

*Not according to the invention.

These results show that the addition of the aminoethoxymethylpolysiloxane, as well as greatly improving the abrasion resistance of the coatings, has considerably increased the release load. To attain a similar range of release values in the absence of the amine compound requires a resin ratio greater than 90:10. When such high resin contents are used the release loads are greatly affected by small changes in resin content and it is extremely difficult in practice to obtain a desired release value by this method. A further advantage arising through the use of the amine compound is the improved subsequent adhesion figures obtained from coatings containing the lower resin contents.

Preparation of aminoethoxymethylpolysiloxane

The aminoethoxymethylpolysiloxane was prepared by reacting aminoethanol with the methylhydrogenpolysiloxane used in the preparation of the solutions A to E, in the proportions of 1 mole of aminoethanol for every g. atom of silicon-bonded hydrogen in the methylpolysiloxane. The aminoethoxymethylpolysiloxane was prepared as follows:

A mixture of 122 parts of ethanolamine and 122 parts of toluene was stirred at 22° C. and 120 parts of a linear methylpolysiloxane of viscosity 20 cs. at 25° C. prepared by the cohydrolysis of 3.5 parts of trimethylchlorosilane and 96.5 parts of methyldichlorosilane added slowly thereto over a period of 2 hours. A vigorous evolution of hydrogen ensued and the reaction mixture became warm. A further 120 parts of toluene were added after completion of the addition of the methylpolysiloxane and the mixture stirred for a further 3 hours. The solution so obtained contained 50% of the aminoethoxypolysiloxane.

EXAMPLE 2

Two solutions, F and G, were prepared of similar composition to solution D of Example 1, except that a hydroxy-ended dimethylpolysiloxane of viscosity 4,000 cp. at 25° C. was used in F and one of viscosity 60,000 cp. at 25° C. in solution G. The solutions were each divided into two portions and 0.5 part of dibutyltin diacetate per 100 parts of solution added to one portion and 0.5 part of dibutyltin diacetate and 0.5 part of the aminoethoxymethylpolysiloxane used in Exemple 1 per 100 parts added to the second portion. Vegetable parchment was treated with these solutions in the manner described in Example 1 and the release values determined as before and compared with those of solution D. Example 1. The values are given in Table 3.

TABLE 3

| | Viscosity (cp., 25° C.) OH ended siloxane | Test tape | No amino compound Release, g./in. IR | No amino compound Release, g./in. AA | AA, secs. | With amino compound Release, g./in. IR | With amino compound Release, g./in. AA | AA, secs. |
|---|---|---|---|---|---|---|---|---|
| Solution: | | | | | | | | |
| D | 500 | S | 3 | 30 | | 40–60 | 170 | |
| | | T | 12 | 45 | 198 | 50–60 | 150 | 430 |
| F | 4,000 | S | 1 | 30 | | 35 | 100 | |
| | | T | 12 | 30 | 300 | 18 | 85 | 425 |
| G | 60,000 | S | 1 | 12 | | 12 | 35 | |
| | | T | 8 | 20 | 335 | 10 | 30 | 435 |

These results show that a useful gradation in release value is obtained by changing the viscosity of the hydroxy-ended dimethylpolysiloxane in the compositions of our invention.

EXAMPLE 3

700 parts of solution D, Example 1, was divided into seven equal portions H to N. To each portion were added 0.5 part of dibutyltin diacetate. In addition amines were added in the amount shown to six of the solutions.

Solution H—No amine added
Solution I—0.5 part of the aminoethoxymethylpolysiloxane used in Example 1
Solution J—1.0 part of the aminoethoxymethylpolysiloxane used in Example 1
Solution K—0.2 part of tetraethylenepentamine
Solution L—0.3 part of tetraethylenepentamine
Solution M—0.4 part of piperidine
Solution N—0.7 part of piperidine The initial release figures obtained using a pressure sensitive adhesive tape of particularly high bond strength in the manner described in Example 1 are given in Table 4.

Table 4

| Solution: | Initial release (g./in.) |
|---|---|
| H | 60 |
| I | 130 |
| J | 140 |
| K | 140 |
| L | 160 |
| M | 230 |
| N | 200 |

These results show that the addition of each of the amino components gives a marked rise in the release value.

EXAMPLE 4

Two solutions, P and Q, of similar composition to solution D of Example 1, except that the resin used in P was a commercially available methylphenylsiloxane resin having a Me:Si ratio of 1:1 and a Ph:Si ratio of 0.55:1 and the resin used in Q was a commercially available methylmethoxysiloxane resin having a Me:Si ratio of 1:1 and a MeO:Si ratio of 0.4:1 were prepared. To both solutions were added 0.5 part of dibutyltin diacetate and 0.5 part of the aminoethoxymethylpolysiloxane used in Example 1 per 100 parts of solution. The release values were obtained in the manner previously described and using Sellotape and Takstrip adhesive tapes and are given in Table 5.

TABLE 5

| | Tape | Release, g./in. IR | Release, g./in. AA |
|---|---|---|---|
| Solution: | | | |
| P | S | 80 | 160 |
| | T | 20 | 80 |
| Q | S | 40 | 70 |
| | T | 20 | 90 |

EXAMPLE 5

13 solutions were prepared each consisting of 100 parts of solution D of Example 1 and 0.5 part of tetrabutyldistannoxane diacetate. Amines were added in the amount shown to twelve of these solutions.

| | Amount, parts | Amine |
|---|---|---|
| Solution: | | |
| 1 | 0 | |
| 2 | 0.5 | Aminoethoxymethypolysiloxane used in Example 1. |
| 3* | 0.27 | Ethanolamine. |
| 4* | 0.40 | Diethanolamine. |
| 5* | 0.54 | Triethanolamine. |
| 6 | 0.43 | Diethylaminoethanol. |
| 7 | 0.28 | n-Butylamine. |
| 8 | 0.28 | Diethylamine. |
| 9 | 0.49 | Triethylamine. |
| 10 | 0.33 | Morpholine. |
| 11 | 0.79 | Tetradecylamine. |
| 12 | 0.22 | Diazabicyclooctane. |
| 13 | 0.11 | Ethylenediamine. |

*Added as 50 percent solutions in isopropanol due to insolubility in toluene.

The initial release and accelerated age values of films prepared from these compositions were determined in the manner described in Example 1 and using a pressure sensitive adhesive tape of high bond strength as used in Example 3 and shown in Table 6.

TABLE 6

| Solution | 1 | 2 | 3 | 4 | 5 | 6 | 7 | 8 | 9 | 10 | 11 | 12 | 13 |
|---|---|---|---|---|---|---|---|---|---|---|---|---|---|
| Initial release, g./in. | 55 | 75 | 65 | 80 | 65 | 85 | 80 | 90 | 80 | 60 | 90 | 65 | 95 |
| Accelerated age, g./in. | 100 | 180 | 140 | 180 | 130 | 160 | 170 | 200 | 155 | 150 | 200 | 150 | 210 |

EXAMPLE 6

12 solutions (14–25) were made up each consisting of 100 parts of Solution D, Example 1, 0.5 part of the tin compound shown in Table 7 and an amine in amount as shown in Table 7.

TABLE 7

| | | Amine | |
|---|---|---|---|
| | Tin compound | Tetraethylene pentamine, part | Aminoalkoxy-polysiloxane as used in Example 1, part |
| Solution: | | | |
| 14 | Stannous octoate | 0.12 | |
| 15 | do | | 0.45 |
| 16 | Dibutyltin dilaurate | 0.18 | |
| 17 | do | | 0.35 |
| 18 | Dibutyltin dioctoate | 0.18 | |
| 19 | do | | 0.35 |
| 20 | Tetrabutyl distannoxane diacetate. | 0.31 | |
| 21 | do | | 0.63 |
| 22 | Dibutyltin bis(benzaldoxime). | 0.28 | |
| 23 | do | | 0.57 |
| 24 | Dibutyltin diacetate | 0.28 | |
| 25 | do | | 0.57 |

The initial release and accelerated age values of films prepared from these compositions were determined in the manner described in Example 1 using Takstrip adhesive tape and are given in Table 8.

TABLE 8

| Solution | Tetraethylenepentamine IR (g./in.) | Tetraethylenepentamine AA (g./in.) | Aminoalkoxypolystannoxane IR (g./in.) | Aminoalkoxypolystannoxane AA (g./in.) |
|---|---|---|---|---|
| 14 | 135 | 370 | | |
| 15 | | | 130 | 270 |
| 16 | 45 | 135 | | |
| 17 | | | 75 | 150 |
| 18 | 60 | 160 | | |
| 19 | | | 70 | 200 |
| 20 | 95 | 240 | | |
| 21 | | | 95 | 190 |
| 22 | 85 | 170 | | |
| 23 | | | 75 | 165 |
| 24 | 90 | 190 | | |
| 25 | | | 85 | 190 |

What we claim is:

1. A composition suitable for coating paper, films and foils comprising an organohydrogenpolysiloxane of viscosity from 2 to 2,000 cp. at 25° C., a linear diorganopolysiloxane having terminal groups selected from the group consisting of hydroxy, alkoxy, aryloxy and acyloxy groups and of viscosity from 100 to 200,000 cp. at 25° C., the organo groups in the organohydrogenpolysiloxane the diorganopolysiloxane being selected from methyl, ethyl, vinyl, allyl, phenyl, trifluoropropyl, chlorophenyl, cyanoethyl and cyanopropyl groups, a polysiloxane resin, of the average general formula $$R_p R'_q SiO_{\frac{4-p-q}{2}}$$

where R is a hydrocarbyl group selected from the group consisting of alkyl, aryl, alkaryl, aralkyl and alkenyl groups, R' is an alkoxy group having not more than 6 carbon atoms or a hydroxy group, $p$ is not less than 0.9, $q$ is from 0 to 0.8 and $p+q$ is from 0.9 to 1.7, an amino compound selected from the groups consisting of tetraethylenepentamine, heptamethyltetraethylenepentamine and methylaminoethoxypolysiloxanes, and a tin compound selected from the group consisting of tin acylates, organotin acylates, organotin alkoxides and organotin oximes, the said organohydrogenpolysiloxane being present in amounts from 3 to 20 parts by weight per 100 parts by weight of the said diorganopolysiloxane, there being from 1 to 99 parts by weight of diorganopolysiloxane per 100 parts by weight of diorganopolysiloxane plus polysiloxane resin, the amino compound and tin compound both being present in amounts from 1 to 20 parts by weight per 100 parts by weight of total polysiloxanes.

2. A composition according to claim 1 wherein the terminal groups on the diorganopolysiloxane are selected from the group consisting of methoxy, ethoxy, butoxy, phenoxy and acetoxy groups.

3. A composition according to claim 1 wherein the diorganopolysiloxane is present in amount from about 25 to about 75 parts by weight per 100 parts by weight of the diorganopolysiloxane plus polysiloxane resin.

4. A composition according to claim 1 wherein R is selected from the group consisting of methyl, ethyl, vinyl, allyl, phenyl, benzyl and hexyl groups.

5. A composition according to claim 1 wherein the organohydrogenpolysiloxane is a trimethylsilyl ended methylhydrogenpolysiloxane.

6. A composition according to claim 1 wherein the amino compound is a methyl(N,N-dimethylaminoethoxy)-polysiloxane.

7. A composition according to claim 1 wherein the tin compound is selected from the group consisting of dibutyltin diacetate and dibutyltin dilaurate.

References Cited
UNITED STATES PATENTS

| | | | |
|---|---|---|---|
| 3,046,160 | 7/1962 | Dengler | 260—825 |
| 3,194,680 | 7/1965 | Damm et al. | 260—825 |
| 3,418,162 | 12/1968 | Adachi | 260—825 |
| 3,436,251 | 4/1969 | Rees | 260—825 |

SAMUEL H. BLECH, Primary Examiner

U.S. Cl. X.R.

117—122; 155; 161—209, 406; 260—13, 31.2, 32.8, 33.4, 33.6, 448.8, 825